June 11, 1940.  E. R. BARRETT  2,203,939
FLUID CONTROL SYSTEM
Filed Aug. 24, 1936  6 Sheets-Sheet 1

INVENTOR
Edward R. Barrett.
BY Harness, Dickey, Pierce & Hann
ATTORNEYS.

Patented June 11, 1940

2,203,939

UNITED STATES PATENT OFFICE 2,203,939

FLUID CONTROL SYSTEM

Edward R. Barrett, Detroit, Mich., assignor to Gar Wood Industries, Inc., a corporation of Michigan Application August 24, 1936, Serial No. 97,490

3 Claims. (Cl. 121—46.5)

This invention relates to fluid distribution systems. More particularly it relates to a novel and improved type of fluid distribution particularly adapted to be associated with a motive power unit for selectively controlling a plurality of remotely disposed hydraulic cylinders.

While it will be clearly apparent from the following description that the apparatus disclosed in the present invention will find wide and practical utility in many and different installations, the specific embodiment of the invention illustrated herein shows the apparatus as applied to a specific form of road working machine. It will be apparent that the novel and improved valve structure disclosed will be equally well applicable in any installation where it is desired to control selectively a plurality of relatively remotely disposed hydraulic actuating cylinders. The apparatus will in general find great utility in many and various fluid distribution systems.

The present invention contemplates the provision of a motive power unit including a power take-off mechanism, which serves to drive a fluid pump. Fluid under pressure delivered by the pump is fed to a bank of independently actuatable control valves which serve to distribute the fluid selectively to any one of a plurality of hydraulic actuating cylinders, which may be located a substantial distance from the distributor valve mechanism and may be connected thereto by means of suitable flexible conduits.

It is an object of the present invention to provide a valve construction comprising a plurality of control valves arranged in side by side relation and interconnected by means of a suitable manifold construction, whereby fluid pressure from a single source may selectively be utilized for operating any of the hydraulic cylinders to which the valves are connected entirely independent of other hydraulic cylinders.

It is a still further object of the present invention to provide a valve construction of this general type in which each of the valves includes a pair of plungers serving to control the distribution of fluid from the pump into the system in a direction and manner such as may be desired and to provide in combination with such valve plungers poppet valves which serve to automatically seal the system against leakage when a predetermined amount of fluid has been pumped thereinto.

The present invention contemplates the provision of a road working machine adapted to be coupled to and towed by a tractor or other motive power unit, such road working machine comprising a plurality of relatively movable parts actuated by a hydraulic cylinder mechanism. The tractor or other motive power unit serves to provide means for causing movement of the road working machine over the surface of the ground and a suitable power take-off mechanism associated with the tractor motor serves to pump a constant supply of fluid under pressure for the purpose of actuating the hydraulic cylinders serving to control actuation of the road working machine. The improved distributor valve of the present invention serves to provide means by which the actuating cylinders may be conveniently selectively controlled.

The present invention also contemplates the provision of a road working machine comprising a framework having front and rear sections pivotally connected together and hydraulic means associated with such pivotal connections for controlling pivotal movement of said sections with respect to each other in order to adjust the vertical position of the apparatus as a whole to the surface over which it travels. A scoop or bowl is pivotally mounted upon one of the sections and hydraulic means are provided for effecting a tilting movement of this scoop bowl with respect to the frame in which it is mounted and the bowl includes a pivotally mounted, independently actuated gate for closing the front of the bowl, in order that, after a predetermined amount of material has been scooped up by the bowl, such material may be retained in position for convenient transportation.

It is a general object of the present invention to provide an assembly of apparatus, such as has been described above, which will be simple in construction, convenient and positive in operation, and of such form that the apparatus as a whole may be easily and conveniently attached to tractors or other sources of motive power without necessary modifications of conventional constructions.

A still further object of the present invention consists in the provision of a fluid distribution valve assembly in which a plurality of valves are arranged in co-operative position side by side. The valves are preferably inter-connected by a suitable distributing manifold which serves to provide means for simultaneously feeding fluid under pressure to the inlet port portions of all of the valves in the bank. The manifold includes an inlet and an outlet port for each of the valves so that fluid supplied to the valve may be distributed to the hydraulic actuating cylinder with which the valve is associated and the other port of the valve provides a duct whereby fluid may be conveniently bled from the one side of the hydraulic cylinder as fluid is supplied to the opposite side thereof. The valves arranged in the bank are further inter-connected by means of a manifold which serves to feed fluid bled from the first valve in the bank through the remaining valves in the bank before this fluid is permitted to return to the supply reservoir.

The invention further contemplates the provision of a novel form of road machine construction in which the road working machine as a whole is constructed of a pair of sections pivotally connected together in such a manner that pivotal movement of one of the sections with respect to the other serves to raise and lower the position of the road working apparatus with respect to the surface over which the machine travels. Hydraulic means are provided for the purpose of regulating the angular position of the component parts of the machines in order that the relative angular pivotal position of these two members may be accurately and conveniently controlled by the operator of the motive power unit which serves to tow the road working machine over the surface to be worked.

Many other and further objects and advantages of the present invention will become clearly apparent from the following specification when considered in connection with the accompanying drawings forming a part thereof.

Figure 1:
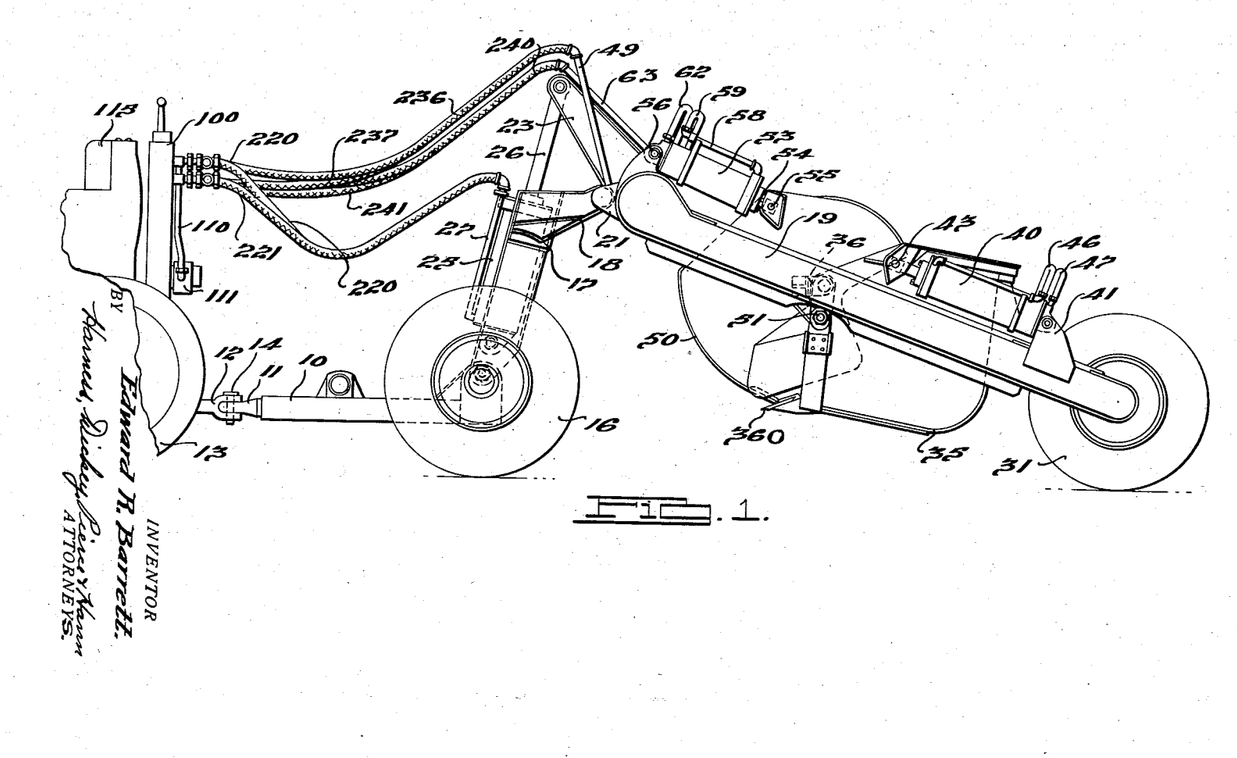
Figure 1 is a fragmentary, side elevational view of the improved road working machine, illustrating the same coupled to the rear end of a conventional caterpillar type tractor motive power unit.
Figure 2:
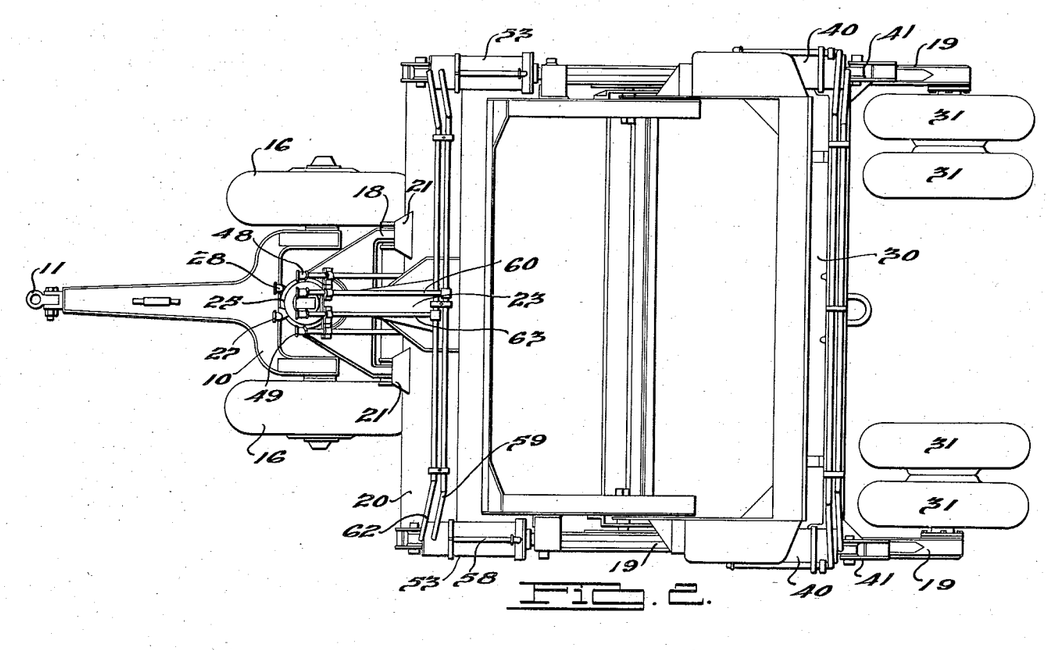
Fig. 2 is a plan view of the road working machine shown in Fig. 1, illustrating the hydraulic cylinders for actuating the various parts thereof, and the conduits for supplying such cylinders with fluid.
Figure 3:
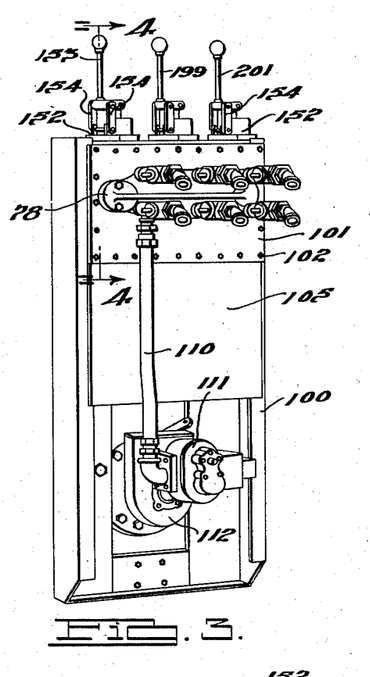
Fig. 3 is a perspective view of the fluid pump, reservoir and distributor valve assembly, which is adapted to be secured to the rear of the motive power unit.
Figure 4:
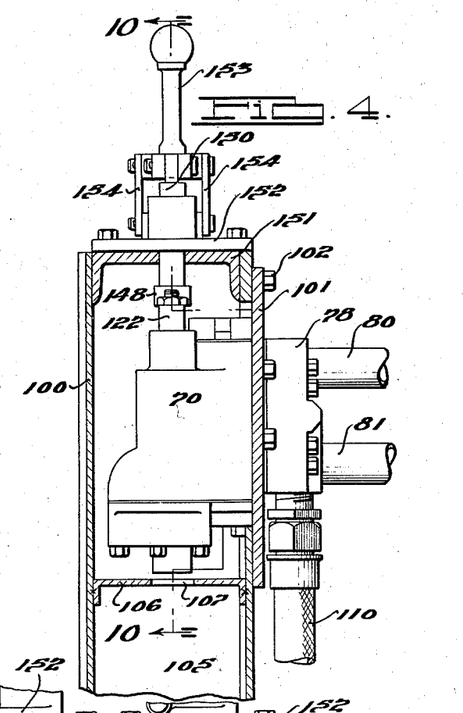
Fig. 4 is a vertical sectional view taken substantially on the line 4—4 of Fig. 3, illustrating the interior construction of the upper portion of the valve housing, showing one of the distributor valves in side elevation.
Figure 5:
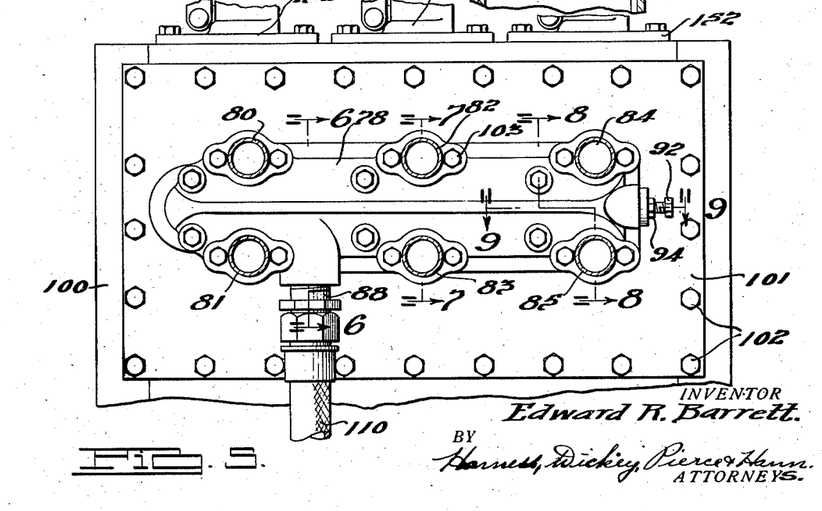
Fig. 5 is a rear elevational view of the upper portion of the valve housing, illustrating in detail the manifold for supplying fluid to, and distributing fluid from the distributor valve assembly.

With more particular reference to the drawings, it will be seen that the road machine, forming a part of the present invention, is clearly illustrated in Figs. 1 and 2. It will be readily appreciated that the particular specific form of road machine illustrated in Figs. 1 and 2 of the drawings is merely illustrative of one of a great number of different types of apparatus which may be conveniently and successfully operated by the improved fluid distribution system described below.

The particular apparatus shown, is in the nature of a travelling scoop and includes a forward frame section 10 to which is secured a pivotally mounted eye 11 for securing the framework to a suitable forked fitting 12 on the rear of a tractor or other source of motive power 13. The eye 11 and the forked fitting 12 may be detachably coupled together by a displaceable coupling pin 14, which will provide easy and convenient means for uncoupling the apparatus at will.

The carriage frame 10 has journalled thereon a pair of road wheels 16 which may, as shown, be mounted upon suitable stub axles for free rotation. Pivotally mounted on the framework 10, preferably substantially co-axially with the wheels 16, is an upwardly extending frame 17. The frame 17, at its upper end, is provided with a pair of spaced rearwardly extending projections 18, which provide means for pivotally interconnecting a rear frame. The rear frame comprises a pair of longitudinally extending side frame members 19, which are transversely interconnected at their forward ends by means of a brace member 20. The brace member 20 has a pair of projections 21 adapted to lie one on either side of the projection 18 formed on the frame 17 and suitable pins may be journalled through these projections in order to provide a relatively strong pivotal connection between the frame members 17 and 19. The transversely extending brace member 20 has rigidly secured thereto, and forwardly and upwardly projecting therefrom, a relatively strong arm 23. A cylinder 25 is pivotally connected at its lower end to the lower portion of the frame 17 and has a piston cooperating therewith, the rod 26 of such piston being pivotally connected to the outer end of the arm 23. The cylinder is preferably closed at both ends and has a pair of conduits 27 and 28 providing communication with the respective lower and upper ends of the cylinder.

From the foregoing, it will be appreciated that as fluid under pressure is supplied to the cylinder through either of the conduits 27 or 28, such fluid will effect a movement of the piston within the cylinder and consequently cause a vertical movement of the piston rod 26. Due to the pivotal connection of the piston rod 26 with the projecting arm 23, which, as has been explained above, is rigid with the rear frame 19, such movement of the piston rod will inherently cause a pivotal movement of the frame work 19 with respect to the frame 17, which movement will serve to raise and lower the position of the frame 19 as may be desired. The function and operation of this apparatus will be described in greater detail below.

The side frame members 19 are inter-connected adjacent their rear ends by means of a transversely extending brace bar 30 and the extreme ends of these frame members are each provided with stub axles upon which are journalled suitable pairs of road wheels 31, which serve to support the rear end of the framework 19 upon the surface over which it is adapted to travel. It will be clearly appreciated that vertical movement of the piston rod 26 will cause a substantial variance in the distance between the wheels 16 and the wheels 31, and a general elongation or shortening of the road machine as a whole, as well as an adjustment of the vertical position of the frame 19.

A scoop bowl 35 is pivotally supported in suitable brackets 36 on the side frame 19, as clearly seen in Fig. 1. The scoop bowl 35 is preferably provided with a downwardly sloped forward edge 360 and a bottom wall which normally lies substantially horizontal to the surface over which the road machine travels. It will be noted that the point of pivotal securement of the scoop bowl 35 is well forward of the general body thereof and it will be appreciated that this construction tends to prevent the scoop from moving about its pivot when the forward edge 360 thereof engages the ground or engages a body of material to be moved. A pair of cylinders 40 are mounted in suitable brackets 41 permanently secured to the side frame members 19, one of the cylinders being located on each side of the framework. The cylinders 40 each contain a piston, which piston has a piston rod connected thereto extending outwardly of the cylinder and pivotally secured at the point 43 to a suitable portion of the framework of the scoop bowl 35 above the pivotal mounting thereof in the bracket 36. It will be appreciated, therefore, that as fluid is supplied to the cylinders 40 to effect an outward movement of the pistons therein, the piston rods will effect a pivotal movement of the scoop bowl about its pivotal axis and consequently will serve to provide effective means for dumping the scoop bowl when such is desired. It will be appreciated at this point that the pivotal mounting of the scoop bowl substantially at the forward portion thereof effects a clean and complete dumping of the scoop bowl after a pivotal movement of perhaps less than 90° has been effected.

The cylinders 40 are each supplied with fluid through flexible conduits 46 and 47, the conduit 46 communicating with the forward end of each of the cylinders and the conduit 47 communicating with the rear end of each of the cylinders. These flexible conduits 46 and 47 are each connected to suitable permanent or rigid conduits 48 and 49, respectively, which extend forwardly along the side frame members and to a point adjacent the front end of the road machine. Each of these conduits is provided with a suitable fitting at its forward end adapted to form convenient means for connecting flexible hoses, hereinafter described in detail.

From the foregoing it will be appreciated that, as fluid under pressure is supplied through the conduit 49, this fluid will simultaneously be discharged into the lower ends of the cylinders 40 located at each of the sides of the scoop bowl and will cause an outward movement of the pistons within the cylinders 40 and a consequent tilting of the scoop bowl about its pivotal mounting 36. It will be appreciated that the forward movement of the pistons within the cylinders 40 will serve to expel fluid from the interior of the cylinders out through the flexible conduits 46 and out through the conduit 48, returning the same to the valve mechanism. It will be seen that the selective supply of fluid to either end of the cylinders 40 such as may be desired serves to provide hydraulic means for accurately regulating the angular position of the scoop bowl with respect to the framework in which it is mounted and, as has been described above, the vertical position of the framework in which the scoop bowl is mounted may be conveniently regulated by means of the hydraulic cylinder 25 and the selective fluid control associated therewith which is described in detail hereinafter.

It has been found preferable in constructions of this general character to provide a gate associated with the scoop bowl 35. While this gate may be of any suitable desired form, by way of illustration the present embodiment of the present invention discloses a gate member 50 which is arcuately curved and has a forward marginal edge adapted to cooperate with the forward marginal edge of the scoop bowl 35. The gate 50 as a whole is pivoted in the side frame members at the points 51 and it will be seen that, as the gate 50 is arcuately moved about its pivot, it will serve to either close or expose the entire front of the scoop bowl 35. A pair of cylinders 53 are mounted on each of the side frame members 19 and these cylinders each serve to house a piston and connected piston rod 54, the outer end of which piston rod is pivotally connected to the gate 50 at the point 55. Each of the cylinders 53 is preferably pivotally mounted at the point 56 on the side frame members 19 so that, as pivotal movement of the gate 50 about its pivot 51 takes place, the cylinder 53 will be permitted to pivot about its own pivotal mounting. Fluid is supplied to the rear end of each of the cylinders 53 by means of conduits 58, which conduits are connected by means of suitable flexible connections 59 to a rigid pipe 60 extending forwardly and provided at its forward end with a fitting for the connection of a suitable flexible hose hereinafter described in detail. The forward end of each of the cylinders 53 is likewise provided with a fluid connection 62 which serves to provide communication between the forward end of each of the cylinders and a rigid conduit 63 having its forward end disposed adjacent the forward end of the conduit 60.

From the foregoing it will be apparent that as fluid under pressure is supplied through the conduit 63 it will simultaneously be supplied to the forward ends of each of the cylinders 53 and will cause a rearward movement of the pistons therein, consequently effecting a pivotal movement of the gate 50 about its pivotal axis 51.

From the foregoing it will be clearly appreciated that convenient hydraulic means are provided for not only regulating the vertical position of the scoop bowl with respect to the surface over which it travels, but also for dumping the scoop bowl and for providing pivotal movement effecting an opening or closure of the gate associated with the scoop bowl, and that further, all of the hydraulic means for accomplishing the above purposes are independent of each other and conveniently adapted for separate actuation.

Novel and improved means are provided for selectively supplying fluid to each of the hydraulic actuating cylinders described above in order that an operator may conveniently control the vertical position of the scoop, the dumping of the scoop or the actuation of the gate, and the fluid distribution system hereinafter described is so constructed and arranged that this control may be mounted in a position remote from the road scraper machine and convenient to the driver or operator of the motive power unit which serves to cause movement of the scoop.

In order to accomplish the selective distribution of fluid to the various hydraulic actuating cylinders, three control valves 70, 71 and 72 are disposed side by side and, as will hereinafter be more clearly seen, the first of these valves 70 serves to control the supply of fluid to and the bleeding of fluid from the cylinder 25 which, as has been described above, serves to regulate the vertical position of the scoop. The valve 71 serves to control the supply of fluid to and the bleeding of the fluid from the pair of cylinders 40 which serve to dump the scoop, and the valve 72 serves to control the supply of fluid to effect the control of the pivotally mounted gate 50.

The valves 70, 71 and 72 are of the type shown and described in detail in applicant's co-pending application, Serial No. 97,489, filed August 24, 1936, and assigned to the assignee of the present invention. Reference may be had to this co-pending application in order to obtain a more complete understanding of the specific advantageous features of each of the valves and the particular adaptability thereof to fluid control systems of the general type disclosed in the present application. In the rear face each of the valves is provided with an inlet port 75 and upper and lower fluid feed ports 76 and 77, respectively. These three ports of each valve are covered and enclosed by a manifold 78 common to all of the valves in the bank. The manifold is clearly seen in Figs. 3 to 9, inclusive. It is noted that this manifold includes a pair of ports 80 and 81 which respectively communicate with the ports 76 and 77 of the valve 70. Likewise, the manifold is provided with a pair of ports 82 and 83 which communicate respectively with the ports 76 and 77 of the valve 71 and a pair of ports 84 and 85 which respectively communicate with the ports 76 and 77 of the valve 72. The manifold is provided with a hollow interior port 86 which communicates with all three of the inlet or feed ports 75 of the valves 70, 71 and 72. This feed port 86 communicates through a duct 87 with a fluid supply fitting 88 through which fluid may be supplied to the interior of the manifold 78 and, consequently, simultaneously made available at all of the inlet ports 75.

It has been found desirable to provide a pressure relief valve 89 which is urged against its seat by means of a spring 90 and serves to control the flow of fluid under pressure through a port 91 in the end of the feed duct 86. The force by which the valve member 89 is urged against its seat may conveniently be controlled by an adjustable set screw 92 threaded through a suitable plug 93 in the end of the manifold 78. In practice, this screw is preferably adjusted to a position such that the pressure exerted by the spring will serve to determine the maximum pressure permitted to exist interiorly of the manifold 78 and the set screw 92 may be conveniently locked in adjusted position by means of a lock nut 94.

While the manifold 78 may, if desired, be bolted directly to the valve members 70, 71 and 72, it has been found preferable to mount the valve members in an enclosing housing 100. The rear wall of the upper portion of the housing 100 is closed by means of a sheet metal plate 101 securely bolted in position on the rear wall of the housing by means of a series of bolts 102. This plate 101 is provided with a plurality of apertures adapted to register with the ports 75, 76 and 77 of each of the valves and is provided adjacent each of these ports with a pair of holes adapted to receive bolts 103 passed through the manifold, through the plate and threadably received by the valve housings 70, 71 and 72, respectively. A suitable sheet of packing or gasket material may be disposed between the manifold and surface of the plate 101 to prevent leakage of fluid from the ports at this point, if desired. It will be seen that the mounting of the manifold 78 and valves 70, 71 and 72 on the plate 101 serves to provide a convenient means of permanently supporting each of the valves within the housing 100. The housing 100 is formed in its vertical central portion to provide a reservoir 105 for maintaining a surplus supply of working fluid, such as oil, which may be conveniently supplied to the valves by the mechanism hereinafter described, and it will be seen that a partition member 106, which serves to separate the reservoir 105 from the upper interior portion of the housing 100 in which the valves are housed, is provided with a plurality of apertures 107 which serve to permit the return of fluid bled from the valves to the reservoir 105. The plate 101 may be provided with an aperture adapted to reach within a port 108 communicating with the escape valve 89 so that any fluid escaping through this valve will inherently be returned to the reservoir 105. The three valves 70, 71 and 72 are in many respects identical in construction and the principles of operation of each are the same. It will be seen that fluid is supplied to the bank of valves through the port 87 by means of a pipe 110 which extends downwardly and is connected to the outlet of a gear pump 111 located in the lower portion of the housing 100 beneath the reservoir 105. The gear pump 111 is of conventional construction and the apparatus of the present invention may utilize any fluid pump which is capable of developing sufficiently high pressures to actuate the hydraulic cylinders, and a gear pump is used merely because it is a simple, convenient, rotary type of pump.

The gear pump 111 is directly driven through a suitable clutch mechanism by the power take-off 112 of the tractor or motive power unit with which the apparatus is associated. It will be clear by reference to Fig. 1 of the drawings that the housing 100 is adapted to be mounted at the rear central portion of a tractor or other motive power unit 115 and in the apparatus disclosed herein, it has been found particularly satisfactory to utilize a type of motive power unit in which the power take-off mechanism is located in the rear central portion in order that the housing 100 may be mounted in the rear central portion convenient to the driver's seat and power take-off mechanism.

It will be readily appreciated that the unit housing 100 may be located in substantially any position that is desired as long as it is conveniently available to the driver of the motive power unit.

The inlet side of the pump is connected by means of a suitable conduit with the lower side of the reservoir 105 in order that this pump may take fluid from the reservoir 105 and deliver such fluid under pressure through the conduit 110 to the manifold 78. It will be seen that this fluid under pressure is delivered through the port 87 into the transversely extending duct 86 which, as has been described above, communicates with the inlet 75 of each of the valve units 70, 71 and 72. The valve member 70 includes a cast housing having a rather complex internal construction of ports and passageways, which is described in detail in applicant's prior co-pending application referred to above. Inasmuch as the specific construction of the valves per se forms no part of the present invention, the details of structure thereof will be dealt with herein only in so far as they have bearing on the general system forming the basis of the present invention.

It will be clear that the ports 75 open into a chamber 120 which surrounds and provides a port communicating with a cylindrical bore 121 extending through the housing of the valve. A valve plunger 122 is provided which closely fits this hollow cylindrical bore 121 and is provided with reduced diameter portions 123, 124 and 125. Chambers 126 and 127 form annular ports communicating with the bore 121 in spaced relation above and below the annular port 120. It will be seen that the reduced diameter portions 123 and 124 are sufficiently long so that in one position of the plunger, these reduced diameter portions serve to establish communication with the adjacent vertically spaced ports. The ports 126 and 127 communicate with a central chamber 128 which serves to conduct fluid through the distributing valve mechanism hereinafter described in detail. The port 76 comunicates with a chamber 130 and the port 77 communicates with a chamber 131. Communication with these chambers is controlled by means of poppet valves 132 and 133, respectively, which poppet valves have a common stem 134. The axial central portion of this stem 134 is enlarged to provide a pistonlike member 135 which is adapted to cooperate with a cylindrical bore formed in the central portion of the housing. The lower portion of the cylindrical bore in which the pistonlike member 135 operates is in communication with the central chamber 128 described above. An annular fluid distribution chamber 136 has a port which communicates with the bore in which the pistonlike member operates and it is seen that the upper end of the bore in which this pistonlike member operates opens into a chamber 137 which is in communication with the ports controlled by the poppet valve 132. A chamber 139 is likewise in communication with the ports controlled by the poppet valve 133 and it is seen that the chambers 136, 137 and 139 each communicate through annular ports 140, 141 and 142, respectively, which ports establish communication with a cylindrical bore 143 controlled by a plunger valve 144. The plunger valve 144 has a pair of enlarged diameter portions 145 and 146, respectively, which enlarged diameter portions serve to fit closely within the bore 143 and control communication between the ports 141, 142, and 140. As is clear by reference to Fig. 10 of the drawings, the plungers 122 and 144 are rigidly interconnected by means of a cross-bar 148 in order that the two plungers will at all times be simultaneously actuated.

A vertically disposed operating rod 150 extends upwardly through an upper wall 151 of the housing 100. The lower end of this operating rod 150 is connected to the central portion of the cross-bar 148 interconnecting the valve plungers 122 and 144. A suitable base casting 152 is secured by means of suitable bolts to the upper surface of the cover 151 and this base casting 152 serves to provide means for supporting an operating handle 153, which is generally L shaped in configuration in the form of a bell crank arm. The handle 153 is secured to the base casting 152 by means of a pair of pivotally connected links 154 and one arm of the bell crank is pivotally connected at its ends to the upper end of the vertically disposed operating arm 150. It will be apparent that movement of the handle 153 will serve to cause vertical movement of the plungers 122 and 144 within their respective bores in the valve housing member 70.

The valve plunger 122 is provided with an internal counter-bore 160 which opens, through a plurality of lateral ports 161, adjacent its upper end and through a second set of lateral ports 162 adjacent its lower end. The lower end of this plunger extends through the lower side of the housing 70 and for a substantial distance downwardly therefrom through a manifold 165 and on through an aperture in the lower side of the manifold. The manifold is provided with two separate chambers into which the openings in the bottom of the valve housing 70 open. The first of these chambers 170 surrounds the plunger 122 at the point where this plunger extends through the manifold. The second of these chambers 171 communicates with an annular port 172 adjacent the lower end of the bore 121 in which the valve plunger 122 is mounted.

The operation of the valve is substantially as follows:

As fluid under pressure is supplied through the ports 75, it will flow inwardly into the valve housing into the annular port 120 surrounding the bore 121. When the valve is in the position shown in Fig. 16 of the drawings, it will be clear that the lateral ports 161 which communicate with the hollow interior of the valve plunger 122 will register with the ports 120 and consequently the fluid under pressure will flow into this hollow bore. This fluid flows down through the hollow bore 160 of the valve and is permitted to escape through the lateral ports 162 at the lower end thereof into the chamber 170. Due to the reduced diameter portion adjacent the lower end of the valve plunger, this fluid may flow upwardly from the chamber 170 and out through the annular port 172 into the chamber 171.

The manifold 165 is preferably a single integral casting which is bolted permanently to the lower sides of all three of the valves 70, 71 and 72. It will be clear that the chamber 171 in this manifold communicates by means of a passage 176 with a chamber 177 surrounding the lower end of a plunger 178 in the valve 71, which plunger is somewhat similar in construction and function to the plunger 122 described in connection with the valve 70. The plunger 178 is of substantially the same general outer configuration as the plunger 122 and cooperates with a series of ports within a hollow bore in substantially the same manner. The only difference between these two valve plungers is that the counter-bore in the valve plunger 178 is considerably shorter than the counter-bore in the valve 122 and the upper series of lateral ports 161 is omitted. The valve plunger 178 is provided with a counter-bore 180 which communicates through a series of lateral ports 181 with the chamber 177. The function of this counter-bore and the lateral ports 181 is merely to balance the pressure on both sides of the valve in order that in all positions the valve will not have any tendency to move axially, and, as will hereinafter be more clearly seen, irrespective of the position in which the valve is adjusted, it will at all times have equal forces balanced on both sides thereof. Consequently, there will be no tendency for axial movement of the valve as a result of fluid pressure imposed thereon.

Figure 11:
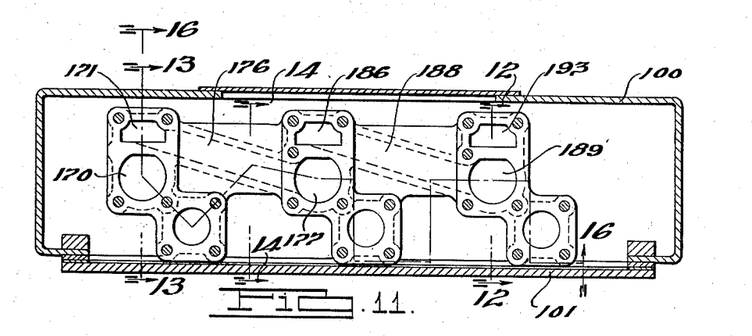
Fig. 11 is a transverse sectional view taken substantially on the line 11—11 of Fig. 10, illustrating in detail the interior construction of the manifold which serves to interconnect the individual valves making up the distributor valve assembly.
Figure 12:
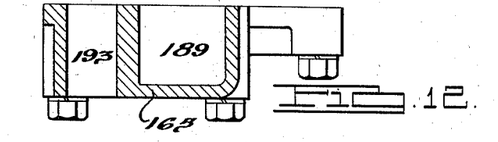
Fig. 12 is a sectional view taken substantially on the line 12—12 of Fig. 11, illustrating the interior construction of a portion of the bleed manifold shown therein.
Figure 13:
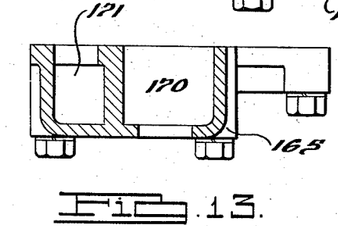
Fig. 13 is a transverse sectional view taken substantially on the line 13—13 of Fig. 11, illustrating in further detail the interior construction of the bleed manifold shown therein.
Figure 14:
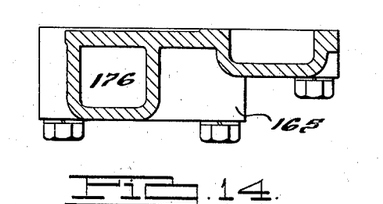
Fig. 14 is a transverse sectional view taken substantially on the line 14—14 of Fig. 11, still further illustrating the interior construction of the bleed manifold.
Figure 15:
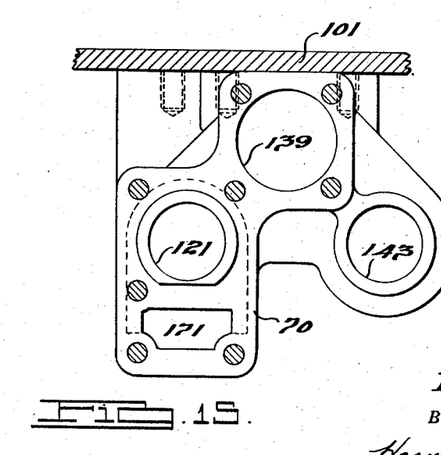
Fig. 15 is a sectional view taken substantially on the line 15—15 of Fig. 10, illustrating in detail the under surface of one of the valves making up the distributor valve unit.

The fluid entering the chamber 177 may flow upwardly therein past a reduced diameter portion 183 adjacent the lower end of the valve plunger 178 and out through an annular port 172 communicating with the hollow bore in which this valve plunger operates. The annular port 172 is substantially identical in construction with annular port 172 described above and this port communicates through a suitable passageway with a chamber 186 in the manifold 165. The chamber 186 is substantially identical in construction with the chamber 171 described above and communicates through a duct 188, seen in dotted lines in Fig. 11 similar in construction to the duct 176, with a chamber 189 surrounding the lower end of the primary plunger 190 of the valve 72. The valve plunger 190 is substantially identical in construction with the valve plunger 178 and it will be seen that fluid may enter the lateral ports at the end thereof to provide a balanced pressure on the end of the valve and at the same time may pass upwardly around the reduced diameter portion 191 adjacent the lower end of this valve and into a chamber 172, similar in construction and position to the chambers 172 described above. This port 192 communicates with an outlet duct 193 through the bottom of the manifold, through which fluid may drain back into the reservoir 105.

With the exception of the plungers 178 and 190, the valves 71 and 72 are identical in interior construction with the valve 70 and each of these valves is provided with a fluid control plunger 144 which in the valve structure 71 is interconnected by means of a cross-bar 196 with the plunger 178 and which in the valve 72 is connected by a crossbar 197 with the valve plunger 190. The crossbar 196 has connected thereto an upwardly extending operating rod 198 which extends through the upper plate 151 of the housing 100 and is adapted to be actuated by a handle 199 similar in construction to the handle 153. The cross-bar 197 likewise has connected thereto a vertical operating rod 200, which is adapted to be actuated by a handle 201 similar in construction to the handles 153 and 199.

Figures 6, 7, 8, 9, 10:
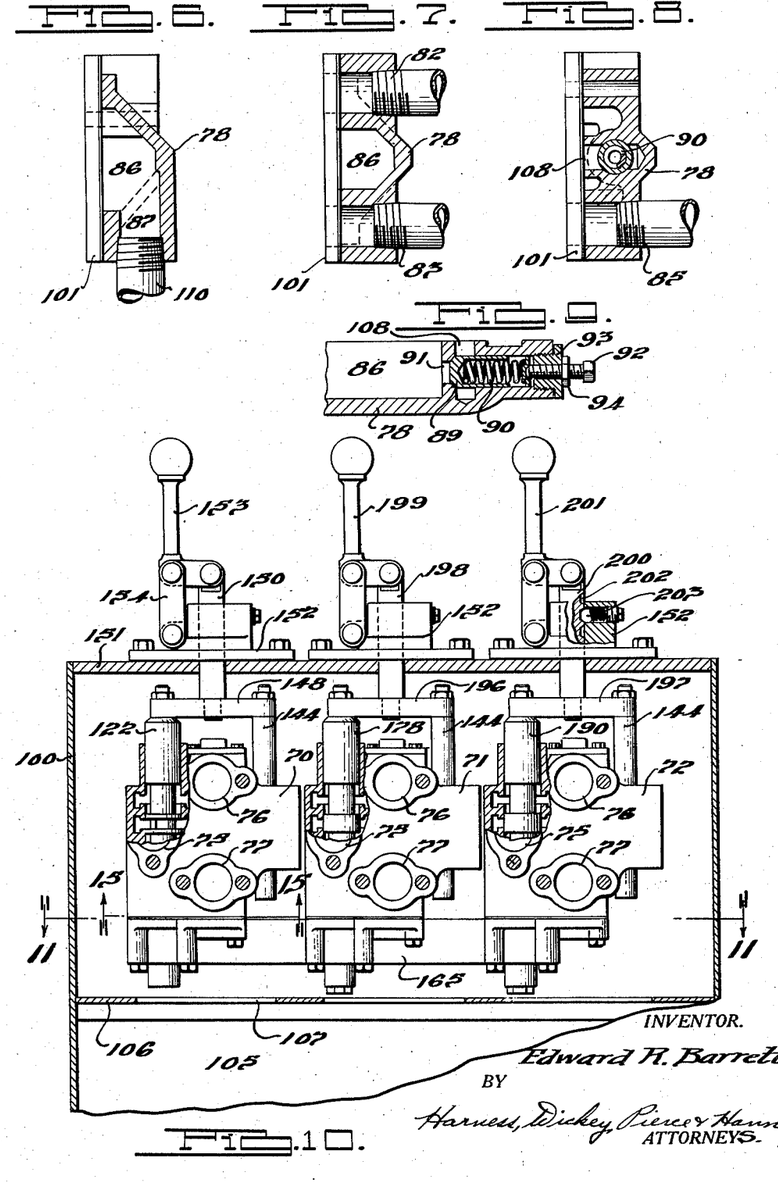
Fig. 6 is a transverse sectional view taken substantially on the line 6—6 of Fig. 5, illustrating in detail the interior construction of a portion of the manifold and the duct for supplying fluid thereto.
Fig. 7 is a transverse sectional view taken substantially on the line 7—7 of Fig. 5, illustrating in detail the interior construction of the distributing manifold, and showing a pair of fluid distribution ports.
Fig. 8 is a sectional view taken substantially on the line 8—8 of Fig. 5, illustrating in detail one of the fluid distribution ports and the manner in which the manifold is secured to the housing.
Fig. 9 is a transverse sectional view taken substantially on the line 9—9 of Fig. 5, illustrating in detail the release mechanism for excessive pressures in the distributing manifold.
Fig. 10 is a transverse sectional view taken substantially on the line 10—10 of Fig. 4, illustrating in detail the distributor valve assembly and showing portions of the distributor valve in section.

As is clearly shown in Fig. 10, the vertically disposed operating rods 150, 198, and 200 may each have a plurality of spaced notches 202 formed in the side thereof at the points where these operating rods extend through their respective base castings 152. A spring pressed ball 203 cooperates with these notches to retain the operating rods in any one of three predetermined adjusted positions. The function of the various valves when in these three positions will become clearly apparent from the following description:

The valve plunger 178 has a reduced diameter portion 210 similar in construction and arrangement to reduced diameter portion 123 described above and a second reduced diameter portion 211 identical with the reduced diameter portion 124 on the valve 122. Similarly, the valve plunger 190 has an upper reduced diameter portion 212 and a lower reduced diameter portion 213 similar in construction and arrangement to the reduced diameter portions 123 and 124, respectively, formed on the valve plunger 122. Inasmuch as the valve structures 71 and 72 are identical in construction with the valve 70 in all respects except the primary plungers thereof, similar reference characters have been utilized in general for designating the ports thereof.

When all three valves are in the position shown in Fig. 10, it will be apparent that fluid supplied by the pump through the conduit 110 to the manifold 78 will be available at the three inlet ports 75 of the valves. This fluid will enter through these ports 75 into the housing of each of the valves and fill the annular ports 120 surrounding the bores in which the primary plungers of each of the valves is disposed. As has been explained above, the fluid entering the ports 75 of the valve 70 will enter the hollow interior of the plunger 122 through the ports 161. However, it will be seen that inasmuch as the plungers 178 and 190 do not have the interior bore extending to this point and are not provided with ports similar to the lateral ports 161, the fluid under pressure will be blocked against further entry into the housings of the valves 71 and 72 due to the presence of the plungers 178 and 190 blocking the annular ports 120. The fluid entering the annular port 120 in the valve 70 will pass downwardly through the hollow interior of the valve plunger 122 and upwardly past the reduced diameter portion 125 of this valve into the chamber 171 along the passageway 176 into the chamber 177 upwardly past the reduced diameter portion 183 of the valve plunger 178 into the ports 172 thereof and downwardly into the chamber 186.

This fluid will then pass along through the duct 188 into the chamber 189 and upwardly past reduced diameter portion 191 of the valve plunger 190 into the chamber 172 thereof and downwardly through the bleed ports 193, where this fluid may be returned by gravity to the reservoir 105 in the housing 100. It will be appreciated that the pump will maintain this circulation of fluid under pressure and that inasmuch as the fluid has a free passageway through which it may bleed, no actuation of the hydraulic cylinders will be obtained when the valves are in this position. It will be appreciated that when the valves are in the position shown, the operation of the apparatus is in neutral and the pump may be run continuously without effecting any re-adjustment of position of the various elements of the road machine.

In the event it is desired to regulate the vertical position of the scoop bucket which is mounted on the frame work of the road scraping apparatus, fluid must be supplied to either one end or the other of the cylinder 25, which is connected by a pair of hoses 220 and 221 to the ports 80 and 81, respectively, of the manifold 78, which ports are in direct communication with the ports 76 and 77 of the valve 70. By way of illustration, it is assumed that it is desired to lower the framework toward the surface over which it is adapted to travel, and consequently it will be appreciated that fluid must be bled from the lower end of the cylinder 25 through the conduit 221 and pumped into the upper end of the cylinder 25 through the conduit 220. In order to accomplish this result, the handle 153 is moved to the left, as viewed in Fig. 10, consequently causing a simultaneous upward movement of the plungers 122 and 144. This upward movement of the plunger 122 is sufficient to raise this valve plunger 122 to a point where the lateral ports 161 are closed by the cylindrical bore 121 in the portion thereof between the annular ports 126 and 120. This inherently brings the reduced diameter portion of this valve into a position where it serves to establish communication between the annular ports 120 and 127. Consequently, it will be seen that fluid entering through the inlet port 75 of this valve will flow into the port 120 past the annular reduced diameter portion 124 of the valve plunger 122 and into the port 127, from whence it will flow directly into the central chamber 128 of this valve. Inasmuch as the valves 71 and 72 remain in the position shown in Fig. 16, it will be apparent that the only escape for the fluid supplied by the pump will be through this path.

Figure 16:
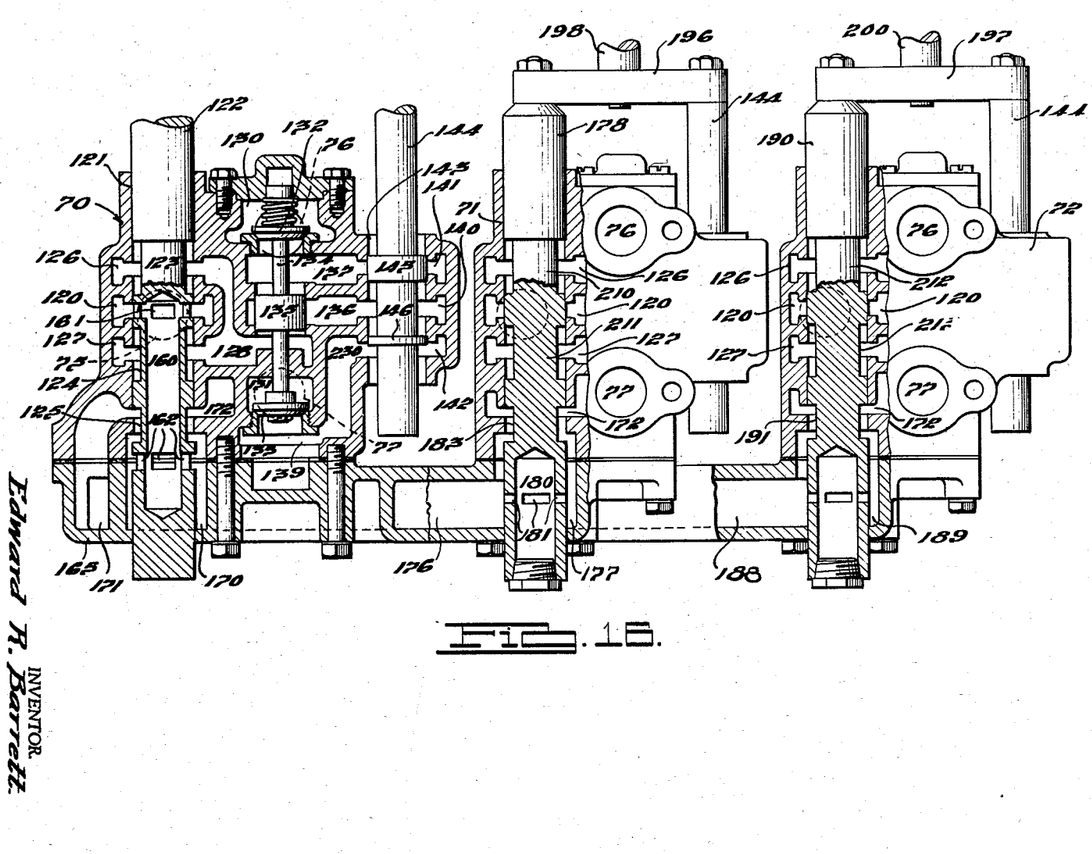
Fig. 16 is a transverse sectional view taken through the valve bank substantially on the line 16—16 of Fig. 11, illustrating in detail the internal construction and arrangement of ports of the various valves and the manner in which the valves are inter-connected for communication by means of the base manifold.

As pressure is supplied by the pump, the pressure will be built up in the chamber 128 and this pressure, as will be clearly seen by reference to Fig. 16, will be exerted upon the lower surface of the pistonlike member 135 formed in the central portion of the valve stem 134 of the poppet valves 132 and 133. The upward movement of the valve plunger 144 simultaneously with the upward movement of the valve plunger 122 serves to raise the plunger 144 to a point where this plunger serves to establish communication between the chambers 136 and 137. As the pistonlike member 135 is raised, communication will automatically be established between the chamber 128 and the chamber 136 and fluid will flow therethrough, and it will likewise be seen that upward movement of the pistonlike member 135 will serve to raise the poppet valves 132 and 133 from their seats and open the ports which these poppet valves serve to control. It will be clear that fluid may flow from the chamber 128 into the chamber 136 past reduced diameter portions of the valve plunger into the chamber 137 out through the ports controlled by the poppet valve 132, and consequently out through the escape ports 76 of the valve housing 70. Inasmuch as this port 76 is directly in communication with the port 80 in the manifold 78, it will be seen that fluid supplied by the pump will be pumped under pressure through the port 80 into the hose or flexible conduit 220, which, as has been described above, connects with the conduit 28, and serves to supply fluid to the upper end of the cylinder 25, causing a downward movement of the piston therein. The downward movement of the piston in this cylinder will serve to expel fluid from the lower end of the cylinder back through the conduit 221, which fluid will be forced through the ports 81 in the manifold 78, which, as has been described, is in direct communication with the ports 77. This fluid may flow into the valve housing through the ports 77 and inasmuch as the poppet valve 133 is raised from its seat, the fluid may flow past this poppet valve into the chamber 139, out through a passageway 230, which, as has been described, is in communication with an annular port 142 surrounding the bore 143, in which the plunger 144 operates. Inasmuch as the lower end of the valve plunger 144 is considerably smaller than the bore in which this valve plunger operates, it will be clear that the fluid may escape from the annular ports 142, out through the lower end of the bore 143, and consequently will drain therefrom into the reservoir 105 in the housing 100.

The valve 70 may be retained in this position until the desired lowering of the framework of the scraper has been obtained, at which time it may be returned to the neutral position shown in Fig. 10, and it will be clear that as soon as the valve is swung to this neutral position, fluid will be again permitted to escape through the lateral ports 161 and consequently the pressure on the under side of the pistonlike member 135 will be relieved and the poppet valves 132 and 133 will be returned to their seats, positively sealing the system and retaining the framework in predetermined adjusted position.

In the event that it is now desired to raise the framework, the control handle 153 is swung to the right, as is viewed in Fig. 10, causing a downward movement of the valve plungers 122 and 144, such downward movement being of about the same magnitude as the upward movement described above. It will be seen that this downward movement serves to move the plunger 122 to a position where the lateral ports 161 thereof are sealed by the wall of the bore 121 existing between the annular ports 120 and 127. This downward movement inherently serves to move the reduced diameter portion 123 of the valve plunger 122 into a position where this reduced diameter portion bridges the ports 120 and 126, establishing communication therebetween. Consequently fluid supplied through the inlet ports 75 of the valve 70 will flow into the chamber 120 upwardly past the reduced diameter portion 123 of the valve plunger 122 into the chamber 126, from whence it is free to flow into the central chamber 128. This pressure exerted on the lower side of the pistonlike member 135 serves to open the poppet valves 132 and 133. Inasmuch as the valve plunger 122 has been moved downwardly, it will be apparent that the plunger 144 must inherently have been moved a like distance downwardly. Consequently, the enlarged diameter portion 146 thereof will serve to close the lower end of the bore 143, in which this plunger operates, and communication will be established between the annular ports 140 and 142. It will be seen that when the valve member is in this position, fluid will be free to flow from the chamber 128 past the pistonlike member 135 into the chamber 136, annular port 140, past the reduced diameter portion of the valve 144, into the chamber 142, and through the passageway 230 to the poppet valve 133.

Inasmuch as this poppet valve is retained in open position, this fluid will flow through the opening controlled by this poppet valve and out through the ports 7, into the conduit 221, which communicates with the lower end of the cylinder 25. As this fluid under pressure is forced into the lower end of the cylinder 25, this will consequently cause an upward movement of the piston in this cylinder and consequently expel fluid from the upper end of the cylinder back through the conduit 220 to the ports 76. Inasmuch as the poppet valve 132 is retained open by the pressure existing on the lower side of the pistonlike member 135, it will be seen that this fluid is free to flow past the poppet valve 132 into the chamber 137, and annular port 141 surrounding the bore 143. Inasmuch as the enlarged diameter portion 145 of the valve plunger 144, which serves to seal this port when the valve is in neutral position, has now been moved downwardly sufficiently far to open this port, it will be clear that the fluid thus returned may enter the bore 143 and spill over the top thereof, where it will normally drain into the reservoir 105 in the housing 100.

From the foregoing, it will be clear that the valve member 70 is easily and conveniently adjustable to any one of three positions, the central or neutral position being disclosed in the drawings, and that movement of the handle to either the left or right, as viewed in Fig. 10, serves to raise or lower the framework of the scraper, as may be desired. It will further be apparent that due to the sealing effect obtained by the poppet valves 132 and 133, the elevation of the scraper mechanism may be accurately retained and regulated in any intermediate position which may be desired, and that due to this tight sealing effect obtained by these poppet valves, once the scraper framework has been adjusted to a predetermined position, it can be retained almost indefinitely in this position due to the fact that the system is entirely closed and tightly sealed.

The operation of the valve member 71, which serves to control the dumping of the scoop bowl 35, by accurately controlling the supply of fluid to and the bleeding of fluid from the cylinders 40 which serve to actuate this scoop, is substantially identical with that described in connection with the valve member 70. The ports 76 and 77 of this valve member 71, as has been described above, are in direct communication with the ports 82 and 83 in the manifold 78 and these ports 82 and 83 are connected by means of their respective flexible conduits 236 and 237 to the permanent conduits 49 and 48, respectively, which communicate with the respective rear and forward ends of the cylinders 40 which serve to control dumping actuation of the scoop 35.

Inasmuch as fluid is constantly supplied by means of the manifold 78 to all three of the ports 75 of the valve members 70, 71 and 72, it will be clear that fluid under pressure is constantly available at the ports 75 of the valve 71. It will be clear by reference to Fig. 16 that as the actuating handle 199 of this valve is moved either to the right or to the left, the consequent movement of the primary plunger 178 of this valve serves to preclude communication between the port 172 of this valve and the chamber 177 surrounding the lower end of the plunger 178. The blocking of the flow of fluid through the bleed manifold at this point serves to stop the flow of fluid through the duct 176 and consequently prevents fluid entering the valve 70 through the ports 75 thereof. Consequently, the fluid in the manifold 78 has no means of escape except through the valve 71. It will be appreciated that either downward or upward movement of the plunger 178 will cause an actuation of the hydraulic cylinders 40 in substantially the same manner as the cylinder 25 described in connection with the valve 70.

With the valves 70 and 71 in neutral position, it will be seen that movement of the handle 201 of the valve 72 to either the right or left will similarly control the supply of fluid through flexible conduits 240 and 241 to the cylinders 53 serving to control actuation of the pivotally mounted gate 50.

From the foregoing it will be appreciated that the construction described herein provides a fluid distribution system in which fluid is supplied through a manifold to all of the valves in the bank. The construction and arrangement of the system is such that with all of the valves in neutral position, the fluid must follow a tortuous path through all three of the valves in order to escape and that this path is continually maintained open as long as the valves are in neutral position and consequently no action of the hydraulic mechanism is obtained. It is also clearly apparent that any one of the valves in the bank may be operated independently of the others and that actuation of any of the individual valves serves to stop bleeding of the fluid through the system and serves to direct the supply of fluid under pressure to the particular system which it is then desired to actuate.

It will be clearly appreciated that the specific embodiment of the invention illustrated in the accompanying drawings and described above is merely illustrative of the broad inventive concept presented in this application. Many other and further modifications of the system disclosed herein falling within the scope of the invention as defined in the subjoined claims will be clearly apparent to those skilled in the art.

I claim as my invention:

1. In a fluid distribution system, a housing having a side wall structure, a plurality of valves interiorly of said housing and mounted adjacent said side wall structure, said valves being mounted in side-by-side spaced relation, each of said valves having an inlet port and a pair of feed ports adjacent said side wall structure, a manifold common to all of said valves mounted exteriorly of said side wall structure, said side wall structure having apertures therein serving to establish communication between said valve ports and said manifold, said manifold having a chamber in communication with all of the inlet ports of said valves and a port in communication with each of said outlet ports of said valves, and securing means extending through said side wall structure serving to lock said manifold and said valves in sealed relation with respect to said side wall structure and to each other whereby to mount said valves and manifold with respect to said housing.

2. In a fluid distribution system a plurality of independently operable valves, each of said valves being a dual bore, fluid pressure piston valve comprising a housing having dual bores connected by a cross-over passage, a receiver piston valve in one of the bores constructed to receive and release fluid when in a normal position and to receive and direct the fluid to the cross-over passage when in another position to build up fluid pressure therein, a distributor piston valve in the other of the bores, means providing distributing passages in the housing, means for moving both of said valves in unison, said distributor piston valve being constructed to selectively direct fluid to the distributing passages, a spring loaded plunger valve element movably disposed within said cross-over passage and movable in response to said build-up of fluid pressure therein to allow fluid to flow to said other of the bores, and a tappet valve in at least one of said distributing passages and connected to said plunger for movement therewith to control flow of fluid to said one distributing passage, a manifold common to all of said valves mounted on and exteriorly of said housings, said manifold having a chamber in communication with one of the bores in each of the valves, the construction and arrangement of the receiver pistons being such that when all of said receiver pistons are in normal position fluid flows through said chamber, and when any one of said receiver pistons is in another position the flow of fluid through said chamber is blocked.

3. In a fluid distribution system a plurality of independently operable valves, each of said valves being a fluid pressure piston valve comprising a housing having parallel bores providing a receiver bore and a distributor bore connected by a cross-over passage, an inlet port communicating with said receiver bore, a receiver piston valve in said receiver bore constructed to receive and release fluid when in a normal position and to receive and direct the fluid to the cross-over passage when in another position to build up fluid pressure therein, a distributor piston valve in the distributor bore, means providing distributing passages in the housing, means for moving both of said valves in unison, said distributor piston valve being constructed to selectively direct fluid to the distributing passages, a spring loaded plunger valve element movably disposed within said cross-over passage and movable in response to said build-up of fluid pressure therein to allow fluid to flow to said distributor bore, and a tappet valve in one of said distributing passages and connected to said plunger for movement therewith to control flow of fluid to said one distributing passage, a manifold common to all of said valves mounted on and exteriorly of said housing, said manifold having a chamber in communication with one of the bores in each of the valves, one of said receiver piston valves being hollow so that when it is in normal position fluid flows from the inlet port of the corresponding valve through said hollow receiver piston valve and into said chamber, the construction and arrangement of the other receiver piston valves being such that when such other receiver pistons are in normal position fluid flows from said chamber through the receiver bores of said other receiver pistons in series, and when any one of said receiver piston valves is in another position the flow of fluid through said chamber is blocked.

EDWARD R. BARRETT.